Oct. 27, 1925. 1,559,298
C. ANDERSEN
MOTION PICTURE MACHINE
Filed Sept. 17, 1920
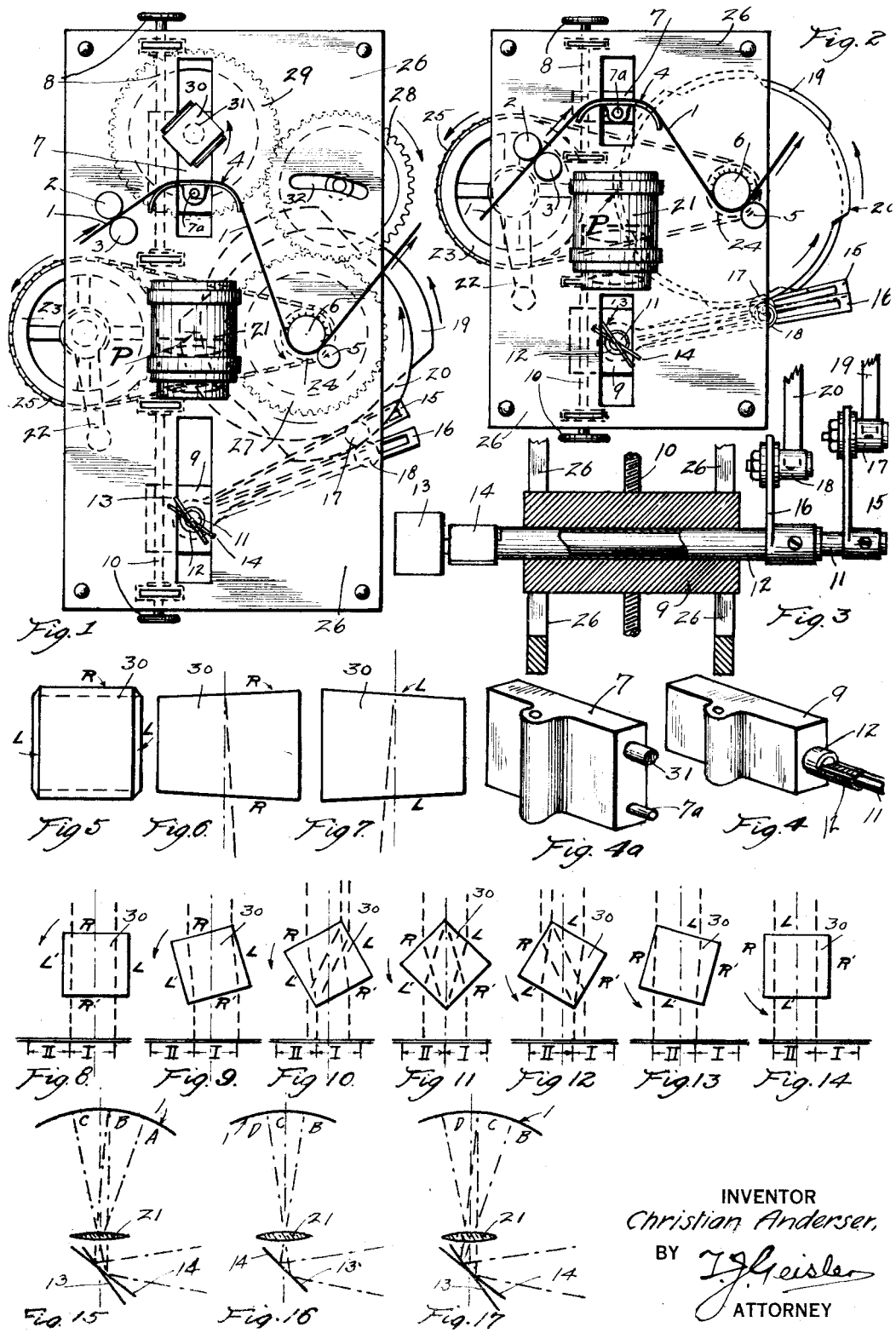
INVENTOR
Christian Andersen,
BY J. J. Geisler
ATTORNEY Patented Oct. 27, 1925.

1,559,298

UNITED STATES PATENT OFFICE.

CHRISTIAN ANDERSEN, OF PORTLAND, OREGON.

MOTION-PICTURE MACHINE.

Application filed September 17, 1920. Serial No. 410,864.

*To all whom it may concern:*

Be it known that I, CHRISTIAN ANDERSEN, a citizen of the United States, residing at 466 10th Street, Portland, in the county of Multnomah and State of Oregon, have invented a new and useful Motion-Picture Machine, of which the following is a specification.

My invention relates to improvements in motion picture machines in which the film moves continuously, the motion of the film being compensated for by oscillating reflectors which move in synchronism with the film and hold the pictures steady on the screen one after another.

This application being intended to merge, continue and complete the certain application for patent for an improvement in motion picture machine, filed by the above named applicant March 15, 1920, under Serial No. 366,044, and which was allowed March 29, 1920, the patentable features of which are not abandoned but are embodied and claimed in the present application, together with the other features in this application described and claimed.

The objects of the invention are:

First, to provide means by which a plurality of reflectors are employed in such a manner that a dissolving view is obtained.

Second, to provide an arrangement of the various parts of the machine by which the relative positions of the parts and angular speed of the reflectors can be varied without disturbing correct optical and mechanical relations, thus making it possible to use lenses of different focal lengths, and Third, to provide as simple a machine as possible.

The invention is also valuable for the use of colors in moving pictures.

The accompanying drawings show two forms of my invention by which these objects are attained.

Fig. 1 is a side view of one form of my invention in which a refracting prismoid is introduced above the aperture plate to move the beam of the light in the direction of the motion of the film and at right angles to such direction;

Fig. 2 is a side view of the form of my invention in which the refracting prismoid shown in Fig. 1 is not employed;

Fig. 3 is a detail drawing showing transversely how the two reflectors and level arms mounted on a concentric shaft and carried by the movable block are actuated by two cams;

Figs. 4 and 4ª are isometric views of two blocks, one of which carries the reflector shaft and the other the aperture plate and revolving prismoid;

Fig. 5 is an end view of the refracting prismoid;

Fig. 6 is a side view of the refracting prismoid showing how two opposite faces make an angle with each other;

Fig. 7 is a side view of same after having turned thru an angle of ninety degrees from the position shown in Fig. 6;

Figs. 8 to 14 inclusive are optical diagrams showing how the refracting prismoid causes the beam of light to follow the advancing film as shown in Fig. 1;

Figs. 15 to 17 inclusive are optical diagrams corresponding to the form shown by Fig. 2 and they illustrate how the two reflectors superpose adjacent pictures on the screen.

Similar numerals refer to similar parts thruout the several views.

The film 1 moves between the rollers 2 and 3 and along the curved aperture plate 4. The roller 5 holds the film against the film driving sprockets 6. The aperture plate 4 is fastened by a stem 7ª to a block 7, the vertical position of which is controlled by the screw 8. Another block 9, the vertical position of which is similarly controlled by the screw 10, is pierced by and carries a shaft consisting of concentric portions 11 and 12 respectively, to which the reflectors 13 and 14, and slotted actuating levers 15 and 16, are fastened. The effective length of the levers 15 and 16 can be varied by moving the rollers 17 and 18 in the slots of the former as indicated. The levers 15 and 16 are actuated by the cams 19 and 20. The lens 21 is adjustably mounted with reference to the film in the usual manner. The machine is driven by the handle 22, the sprocket wheels 23 and 24, and the sprocket chain 25. Two plates 26 form the sides, or housing, of the machine.

The parts already mentioned are common to the two forms of the invention here shown.

The device shown in Fig. 1 has. in addition, the following parts: The gears 27, 28 and 29 rotate a refracting prismoid 30 on a shaft 31, which is carried by the block 7 which carries the aperture plate 4. To accommodate the different positions of block 7 the gear 28, which is an idler, can be placed in different positions in the slot 32.

The revolving prismoid 30, the aperture plate 4, the lens 21 and the reflectors 13 and 14 are located in the same vertical line.

The parts are so proportioned and arranged that when the machine is driven the reflectors 13 and 14 receive and hold steady on the screen (not shown) the advancing film pictures in succession. It is clear that the angle through which the reflectors move during the time of reflecting each picture, in other words the speed of the reflector, must be accurately determined. With the lens placed as shown by Figs. 1 and 2, this angle of oscillation, corresponding to one picture is equal to one-half the angle subtended by each picture at the optical center of the lens.

One mode of solving the problem of adjusting the angular speed of the reflector in my invention may be stated as follows:

Let $a$ be the angle of oscillation of each reflector corresponding to one picture, D the focal length of the lens in use, L the effective length of lever, F the offset or drop on the cam corresponding to one picture, and W the width of one picture, then, very nearly, $$\sin a = \frac{1/2W}{D} \text{ and } \sin a = \frac{F}{L} \text{ or } \frac{1/2W}{D} = \frac{F}{L}$$

Now as W and F are constants for any machine, the variables D and L are proportional, and if F is made equal to $\frac{1}{2}$W, D and L will be equal. As shown by Figs. 1 and 2 the parts can then be so arranged that the center of the reflector shaft in any position is on a vertical tangent to the mean cam circumference with a stationary point of tangency P. If now the reflector shaft is placed a distance equal to D below this point of tangency the lever arm with effective length, also equal to D, will form another tangent to the cam with the roller at a point of tangency, which is the best position for accurate movement.

In Fig. 1 the angle of oscillation corresponds to the width of two pictures, because portions of each picture are shown during two picture periods, hence the large offset on the cams as compared to Fig. 2 where each reflector oscillates to correspond to the width of only one picture; but in either case the effective length of levers 15 and 16 and therefore the angular speed of the reflector corresponds to the focal length of lens used, which is greater in Fig. 1 than in Fig. 2. Figs. 1 and 2 show the roller to be at the point of tangency in both cases, although the length of levers (equal to the focal length of the lens) are different.

The reflecting surfaces of the two reflectors 13 and 14 must pass through the center of revolution of the reflector shaft.

Referring now to Figures 15, 16 and 17 for the operation of my device as shown in Fig. 2, the cycle of operation is as follows: In Fig. 15 reflector 13 is reflecting picture B, and reflector 14 picture C; this condition has lasted for one-half the length of a picture period, and reflector 13 is about ready to return and reflect picture C. Fig. 16 shows the condition when this change has taken place, and both reflectors are now reflecting picture C which lasts for the length of one-half of a picture period. In Fig. 17 reflector 13 is still reflecting picture C, and reflector 14 has returned and is reflecting picture D, and so on. With this arrangement the dissolving effect lasts about one-half of each picture period.

In Fig. 2 each reflector will reflect all the film exposed at the aperture plate; the excess image not wanted may be excluded from the screen by a frame in front of the machine, and by framing the screen by dark material.

With arrangement shown in Fig. 2 the beam of light covers two pictures, which is a disadvantage as the intensity of the available light is thereby reduced. This disadvantage is overcome by the use of the refracting prismoid 30, shown in Fig. 1, which is revolved in the beam of light above the aperture-plate at a speed of 90 degrees during the time of one picture. By virtue of its shape, as shown by Figs. 5, 6 and 7, it will move the beam of light in the direction of the motion of the film and also bend the ray transversely to said direction. Figs. 6 and 7 show how a ray of light is bent transversely. In Figs. 5 to 14, R and L designate faces opposite to each other of the prismoid.

Figs. 8 to 14 show positions of the revolving prismoid differing from each other by 15 degrees, and corresponding positions of two pictures I and II on the film. The light entering faces R and L and emerging at R' and L' respectively moves ahead with the advancing film. In addition to this forward motion the light is refracted transversely so that during the cycle shown by Figs. 8 to 14, portions of picture 1 are carried to one reflector by light beams passing through R and R' while portions of picture 2 are carried to the other reflector by light beams passing through L and L'.

Each reflector is oriented on its shaft so that it would reflect one whole picture to the screen in the same place to which the other reflector would reflect an adjacent whole picture, provided each whole picture were illuminated; but as shown by Figs. 9 to 13, only a portion of each picture is illuminated at any one time. These illuminated portions are supplemental and together form one whole picture. The orientation of the cams on the shafts cause the two portions to appear on the screen in their correct relative positions. During the time that each reflector, after having completed its picture, is returning to its initial position the other reflector carries one entire picture (see Figs. 8 and 14) so that at all times there is a complete picture on the screen. The beam of light is only large enough to cover one picture and only the space of one picture will be illuminated on the screen. This accomplishes two things, viz: The available amount of light gives the maximum intensity on the screen, and there will be no excess image to exclude by a frame, as is the case in Fig. 2.

The movement of the beam of light caused by refraction in the revolving prismoid would not be accurate enough to accomplish the purpose served by the reflectors in placing the pictures in exact position on the screen, but it is sufficiently accurate to serve in distributing the illumination as shown above. It will be noted that in Fig. 1 portions of two pictures will be on the screen continuously during a two picture period; hence the large eccentricity of the cam.

On the drawings only two reflectors are shown but it is clear that more might be used without a departure from the invention. I have only shown those parts of two types of machine to which my invention is applicable which are necessary to illustrate the invention, and I do not, therefore, limit my invention to the particular embodiments here shown.

I claim:

1. A motion picture machine of the character described comprising means for guiding and continuously moving a film, a plurality of reflectors, means for moving the reflectors in synchronism with the film, means for regulating the speed of the movement of the reflectors, means for controlling the distance between the film and the reflectors, and an objective lens adjustably mounted with reference to the film.

2. A motion picture machine of the character described including means for guiding and continuously moving a film, a plurality of reflectors, means for moving the reflectors in synchronism with the film, means for regulating the speed of said synchronous movement, and an objective lens adjustably mounted in relation to the film.

3. A motion picture machine of the character described including means for guiding and continuously moving a film, a plurality of reflectors, means for moving the reflectors in synchronism with the moving film, means for controlling the distance between the film and the reflectors, and an objective lens adjustably mounted with reference to the film.

4. A motion picture machine comprising means for continuously moving a film, an aperture plate movably mounted, a lens, a plurality of reflectors movably mounted, means for operating the reflectors in synchronism with the moving film, such means consisting of a plurality of disc cams and a plurality of levers adjustable as to length, the eccentricity or drop on each cam effective during one picture period being equal to one-half the width of one film picture, and the effective length of each lever being equal to the focal length of the lens, the parts being so arranged that the aperture plate and reflectors can be placed in different positions along a straight line with a common point of tangency to the mean cam circumference and the reflectors, during operation, being placed at a distance from said point of tangency equal to the effective length of the levers.

5. In a motion picture machine of the character referred to, means for continuously moving a film, a plurality of reflectors, means for moving the reflectors in synchronism with the film, means for controlling the speed of the said synchronous movement and means for moving a beam of light in the direction of the motion of the film and transversely to the said direction.

6. In a motion picture machine of the character referred to a plurality of reflectors means for moving the reflectors in synchronism with a film, means for controlling the distance between the film and reflectors and means for moving a beam of light in the direction of the motion of the film and transversely to said direction.

7. In a motion picture machine a moving film, a plurality of reflectors, means for moving the reflectors in synchronism with the moving film, and a refracting prismoid between the source of the beam of light and the film, such prismoid being moved in synchronism with the film and the reflectors.

8. In a motion picture machine, a moving film, a plurality of reflectors, means for moving the reflectors in synchronism with the moving film and refractive means for bending the beam of light before it reaches the film such refracted means being moved in synchronism with the film and with the reflectors.

9. In a motion picture machine, a means for producing a beam of light, a moving film, and a revolving refracting element whose faces are successively and in alternate directions inclined towards the axis of revolution, the beam of light being thereby bent transversely to the direction of the motion of the film.

CHRISTIAN ANDERSEN.